US012570475B2

(12) United States Patent
Vulpetti et al.

(10) Patent No.: US 12,570,475 B2
(45) Date of Patent: Mar. 10, 2026

(54) CONVEYOR COMPONENT WITH FLEXIBLE HUB AND CONVEYOR ASSEMBLY

(71) Applicant: Laitram, L.L.C., Harahan, LA (US)

(72) Inventors: Matthew Vulpetti, Metairie, LA (US); Ryan Hale, New Orleans, LA (US)

(73) Assignee: Laitram, L.L.C., Harahan, LA (US)

( * ) Notice: Subject to any disclaimer, the term of this patent is extended or adjusted under 35 U.S.C. 154(b) by 22 days.

(21) Appl. No.: 18/712,063

(22) PCT Filed: Nov. 16, 2022

(86) PCT No.: PCT/US2022/050091
§ 371 (c)(1),
(2) Date: May 21, 2024

(87) PCT Pub. No.: WO2023/101816
PCT Pub. Date: Jun. 8, 2023

(65) Prior Publication Data
US 2025/0019177 A1 Jan. 16, 2025

Related U.S. Application Data

(60) Provisional application No. 63/285,112, filed on Dec. 2, 2021.

(51) Int. Cl.
B65G 23/04 (2006.01)
(52) U.S. Cl.
CPC .................................. B65G 23/04 (2013.01)
(58) Field of Classification Search
None
See application file for complete search history.

(56) References Cited

U.S. PATENT DOCUMENTS 4,495,683 A 1/1985 Delhaes
6,086,495 A * 7/2000 Stebnicki ................ F16H 55/12
474/96

(Continued)

FOREIGN PATENT DOCUMENTS

JP 2008-168997 A 7/2008
JP 2013001522 A 1/2013

OTHER PUBLICATIONS

International Search Report and Written Opinion of the International Searching Authority, PCT/US2024/042422, mailed Nov. 25, 2024, Korean Intellectual Property Office, Daejeon, Republic of Korea.

(Continued)

*Primary Examiner* — Kavel Singh
(74) *Attorney, Agent, or Firm* — Catherine M. Bishop

(57) ABSTRACT

A conveyor component for use in a conveyor includes a flexible hub for mounting a shaft and a continuous rim connected to the flexible hub for contacting a conveyor belt. The flexible hub includes a peripheral gap that can be widened using an expansion tool to enlarge a shaft-receiving opening formed by the flexible hub. Positioning tabs on a radially inner surface of the flexible hub move into engagement with a groove on the shaft when the conveyor component is in a relaxed state and the peripheral gap is contracted and out of engagement with the groove when the peripheral gap is expanded, and the flexible hub is flexed.

19 Claims, 19 Drawing Sheets

(56)                    References Cited

U.S. PATENT DOCUMENTS

| | | | |
|---|---|---|---|
| 9,422,026 | B1 | 8/2016 | Cody |
| 9,598,244 | B2 | 3/2017 | Snabb et al. |
| 9,751,697 | B2 | 9/2017 | Ma |
| 10,605,347 | B2 | 3/2020 | Larson |
| 11,130,638 | B2 * | 9/2021 | Westergaard Andersen ................ B65G 39/02 |
| 2005/0061633 | A1 | 3/2005 | Vetter |
| 2010/0242649 | A1 | 9/2010 | Vandewal et al. |
| 2019/0112129 | A1 | 4/2019 | Batchelder et al. |
| 2020/0207548 | A1 | 7/2020 | Kokx |

OTHER PUBLICATIONS

Extended European Search Report, European Application No. 22902017.
7, mailed Nov. 25, 2025, European Patent Office, Munich, Germany.

* cited by examiner

CONVEYOR COMPONENT WITH FLEXIBLE HUB AND CONVEYOR ASSEMBLY

RELATED APPLICATIONS

The present invention claims priority to U.S. Provisional Patent Application 63/285,112, filed Dec. 2, 2021, and entitled "Conveyor Roller and Conveyor Roller Assembly", the contents of which are herein incorporated by reference.

FIELD OF THE INVENTION

The present application relates to power-driven conveyors. More particular, the present invention relates conveyor components, such as rollers and sprockets used to support and—or drive a conveyor belt in a returnway, infeed or another location.

BACKGROUND OF THE INVENTION

Conveyor belts are used in many industries to convey products from first location to a second location. Conveyor belts generally form an endless belt loop that is trained around drive and idler sprockets or rollers at each end of a conveying path. Articles are conveyed atop the conveyor belt are supported along an upper carryway. The conveyor belt returns along a lower returnway. To minimize the maximum sag of the conveyor belt in the returnway, return shoes or rollers are often used. Return rollers typically extend across the width of the conveyor belt at selected positions along the returnway. Rollers may also be used to support a conveyor belt at the infeed end of the endless conveyor belt circuit and—or another location. Mounting rollers, sprockets and other components on a shaft in a conveyor can be difficult and cumbersome. In addition, separate locking components are often required to secure the component in a fixed axial position along the shaft.

SUMMARY OF THE INVENTION

A conveyor component for use in a conveyor includes a flexible hub forming an expandable shaft opening for receiving a shaft and a continuous rim connected to the flexible hub for contacting a conveyor belt. The flexible hub includes a peripheral gap to allow expansion of the shaft opening to facilitate installation onto and removal from the shaft. Axial tabs may interlock with a groove on the peripheral surface of the shaft to secure the conveyor component on the shaft in a relaxed, operating position.

According to one aspect, a component for a conveyor comprises a flexible hub having a radially inner surface forming an axially-extending, expandable shaft opening for receiving a shaft, a radially outer surface and a peripheral gap between the radially inner surface and the radially outer surface for allowing the shaft opening to selectively expand and a rim connected to the flexible hub. The rim has a continuous periphery for contacting a conveyor belt.

According to another aspect, an assembly for a conveyor comprises an axially-extending shaft and a component mounted on the shaft. The component has a flexible hub forming an axially-extending, radially-expandable shaft opening for receiving the axially-extending shaft and a rim connected to the flexible hub. The rim has a continuous periphery for contacting a conveyor belt.

According to another aspect, an assembly comprises a conveyor component having a flexible hub and an expansion tool. The flexible hub has a radially inner surface forming an axially-extending, expandable shaft opening for receiving a shaft, a radially outer surface and a peripheral gap between the radially inner surface and the radially outer surface for allowing the shaft opening to selectively expand. A rim is connected to the flexible hub and has a continuous periphery for contacting a conveyor belt. The expansion tool is configured to selectively enlarge the peripheral gap to expand the shaft opening.

DETAILED DESCRIPTION

A conveyor component includes a flexible hub connected to a rim. The conveyor component can be a roller, sprocket or any suitable shaft-mounted conveyor component. The invention will be described below relative to certain illustrative embodiments, though those skilled in the art will recognize that the invention is not limited to the described embodiments.

Figures 1, 2:
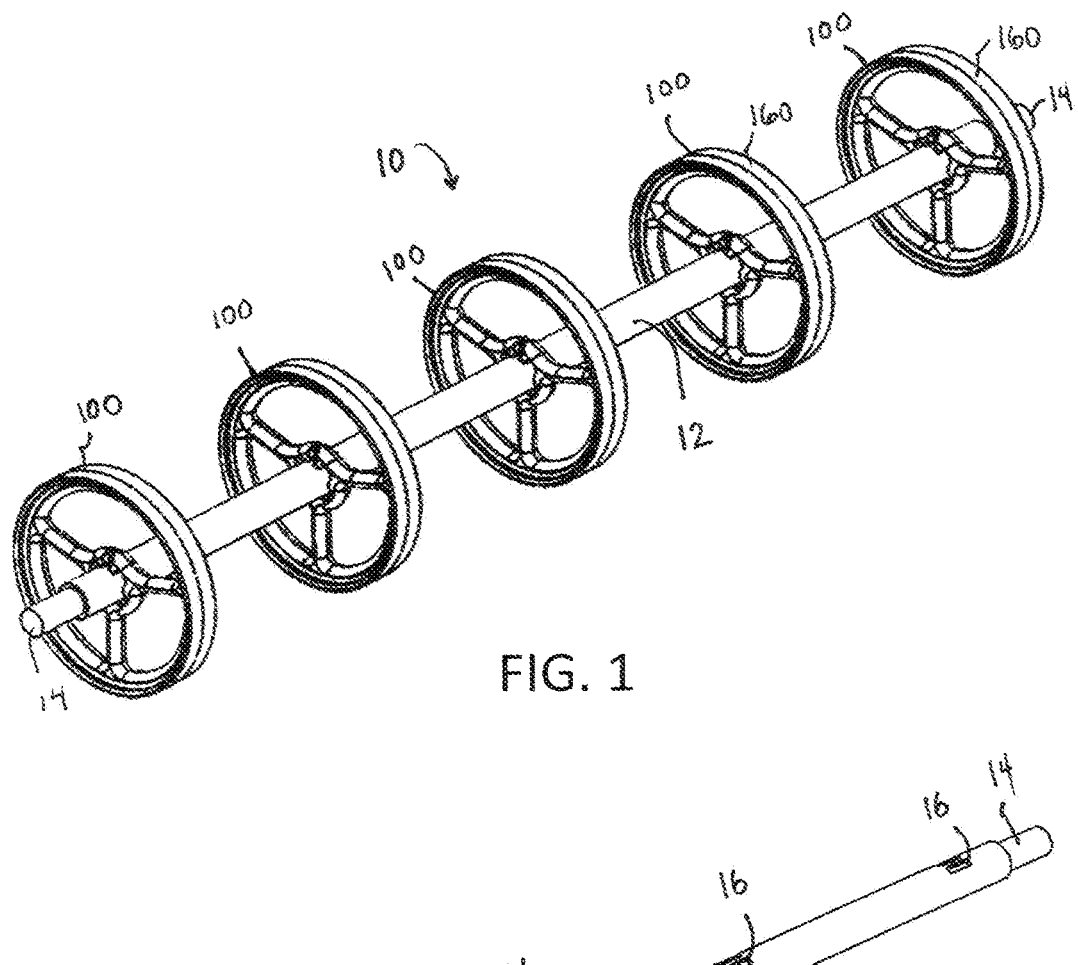
FIG. 1 is an isometric view of a roller assembly for a conveyor.
FIG. 2 is an isometric view of the roller assembly of FIG. 1, with some rollers removed.
Figures 3, 4:
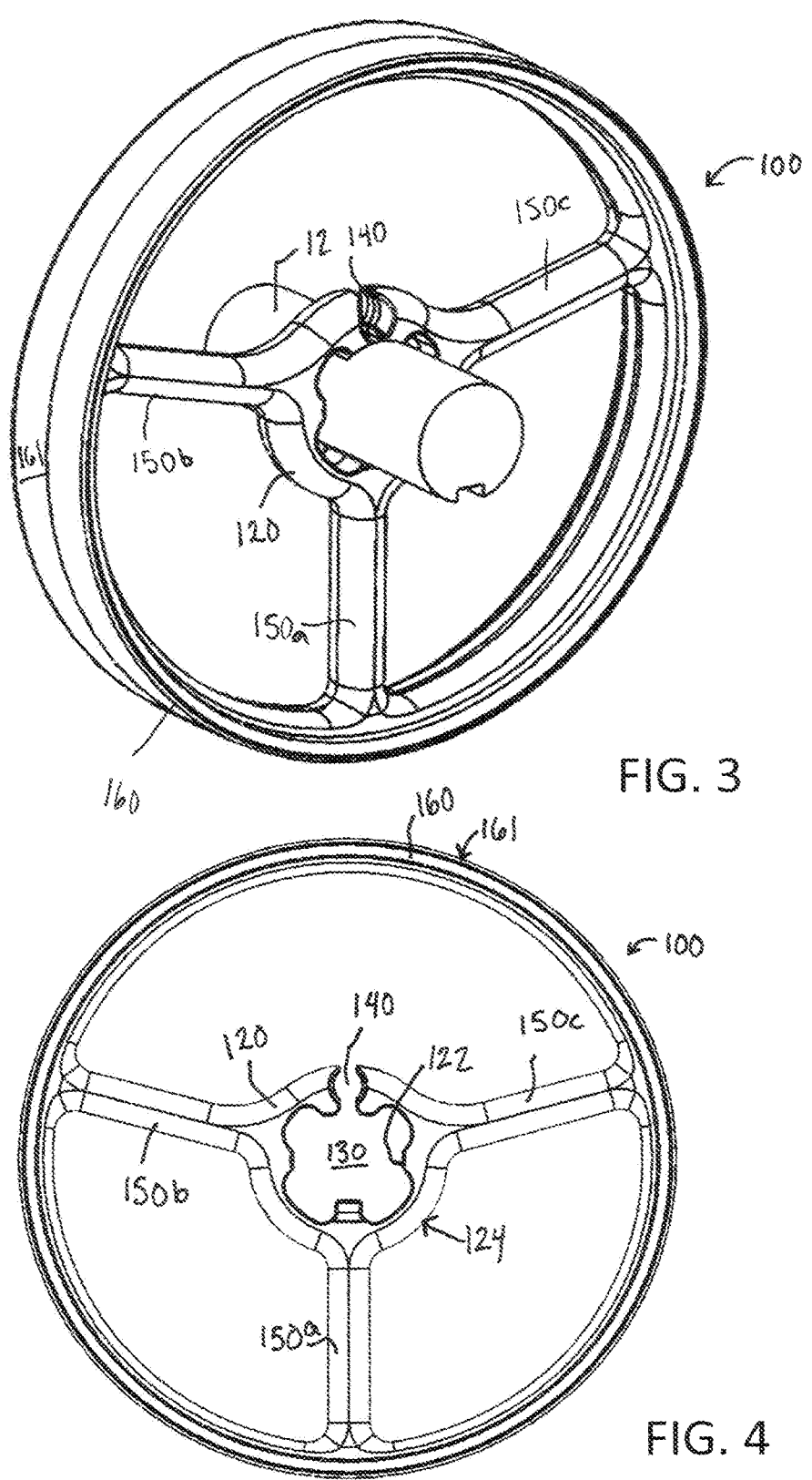
FIG. 3 is an isometric view of a roller with a flexible hub mounted on a shaft.
FIG. 4 is a front view of the roller of FIG. 3.

Referring to FIGS. 1-2, a conveyor roller assembly 10 comprises a series of conveyor rollers 100 mounted on a mounting shaft 12 in a conveyor. The illustrative series of conveyor rollers 100 are evenly spaced along the axial length of the mounting shaft, but the invention is not so limited, and any number conveyor rollers 100 can be mounted in any suitable location and—or patterns. In one embodiment, the conveyor rollers are returnway rollers, mounted in the returnway of a conveyor for guiding and—or supporting the conveyor belt as it travels from the outfeed, discharge end, back to the infeed of the conveyor. As the conveyor belt moves over the outer rims 160 of the conveyor rollers 100, it may spin the conveyor roller assembly 100. The illustrative rollers 100 are fixedly mounted to the mounting shaft 12 during operation, with end journals 14 inserted in bearings or saddles to allow spinning of the whole assembly 100 in unison. One skilled in the art will recognize that the illustrative conveyor roller assembly may be implemented in any suitable location in a conveyor, such as the infeed or other suitable location where support of a conveyor belt is useful.

The rollers 100 may comprise flexible hubs to facilitate mounting and dismounting of the respective roller on the mounting shaft 12. As described below, grooves 16 in the peripheral surface of the mounting shaft 12 in mounting regions engage locking tabs on the rollers to prevent or limit migration of the rollers along the axial length of the mounting shaft 12.

The grooves 16 may be sized to fix the rollers or allow floating of the rollers along the mounting shaft 12.

Referring to FIGS. 3-6, an illustrative conveyor roller 100 comprises a flexible hub 120 forming an expandable shaft opening 130 for receiving the mounting shaft. The flexible hub 120 includes a radially inner surface 122 forming the expandable shaft opening 130 and a radially outer surface 124. Spokes 150 extend radially from the radially outer surface 124 of the hub 120 and connect the hub 120 to an outer rim 160, the outer surface 161 of which contacts and supports a conveyor belt. The outer rim 160 is continuous and forms a closed periphery. An outside surface 161 of the outer rim 160 contacts a conveyor belt. In one embodiment, the roller 100 can be a sprocket with peripheral teeth on the outer rim 160 for driving a conveyor belt.

The illustrative expandable shaft opening 130 is circular in cross-section but the invention is not so limited. For example, the expandable shaft opening can be square to accommodate a square shaft, or have any suitable size, shape and configuration to accommodate any suitable size, shape and configuration of a shaft.

The flexible hub 120 includes a peripheral gap 140 to allow selective expansion of the expandable opening 130. In a relaxed, operating state, the flexible hub 120 snaps onto the shaft 12, with bearing surfaces on the radially inner surface 122 bearing against the shaft outer surface. The radially inner surface 122 can include cleaning recesses so that bearing surfaces only contact a portion of the periphery of the shaft. When the peripheral gap 140 is widened, the shaft opening 130 enlarges to pull at least some of the bearing surfaces away from the shaft 12 to allow axial sliding of the shaft 12 relative to the roller.

The illustrative flexible hub 120 includes radially inwards-extending positioning tabs 152, 154 that engage a peripheral groove 16 on the shaft 12 to secure the axial position of the roller 100 on the shaft. The illustrative positioning tabs 152, 154 are formed adjacent a radially inner end of the peripheral gap 140, but the invention is not so limited. When the flexible hub is in a relaxed state, the positioning tabs 152, 154 engage and are inserted in the groove 16. When the flexible hub is in a flexed, expanded state, the positioning tabs 152, 154 disengage from the peripheral groove 16 to allow axial sliding of the roller 100 relative to the shaft 13 for mounting, removal and—or repositioning.

The illustrative peripheral gap 140 in the flexible hub 120 is formed by confronting end faces 142, 144. The illustrative end faces 142, 144 have a concave shape to form a substantially cylindrical-shaped gap 140, but the invention is not so limited. The shaped end faces 142, 144 have radially outer tips intersecting the hub outer surface 124 and radially inner tips that transition to the positioning tabs 152, 154. The size, shape and configuration of the peripheral gap 140 enables widening of the peripheral gap 140 by separating the end faces 142, 144 while preventing migration of the shaft 12 from the shaft opening 130. Even in a fully flexed, open state, the gap 140 is significantly smaller than the shaft 12 to contain the shaft 12 within the shaft opening 130 while enabling sliding of the shaft 12 relative to the shaft opening 130.

Figure 5:
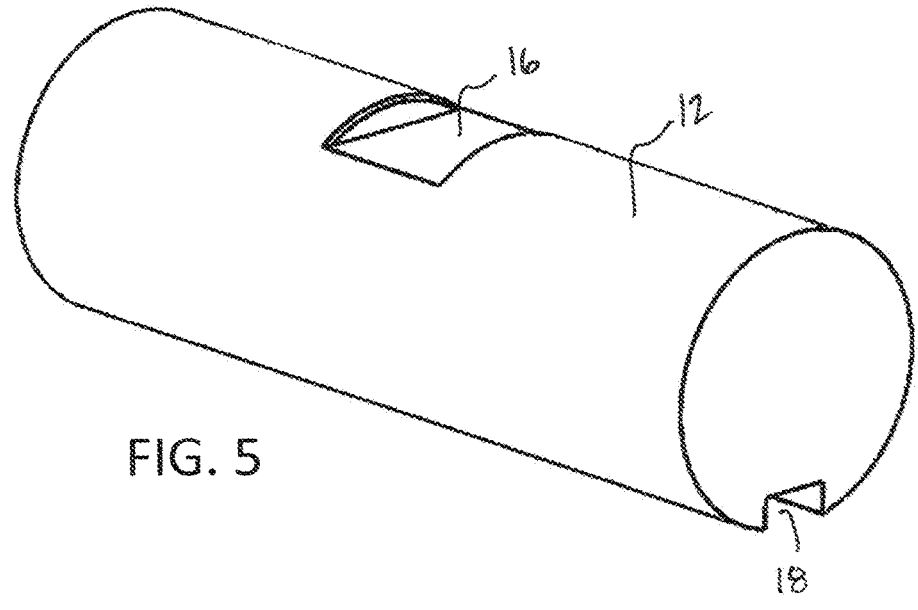
FIG. 5 is an isometric view of the shaft of FIG. 3.
Figure 6:
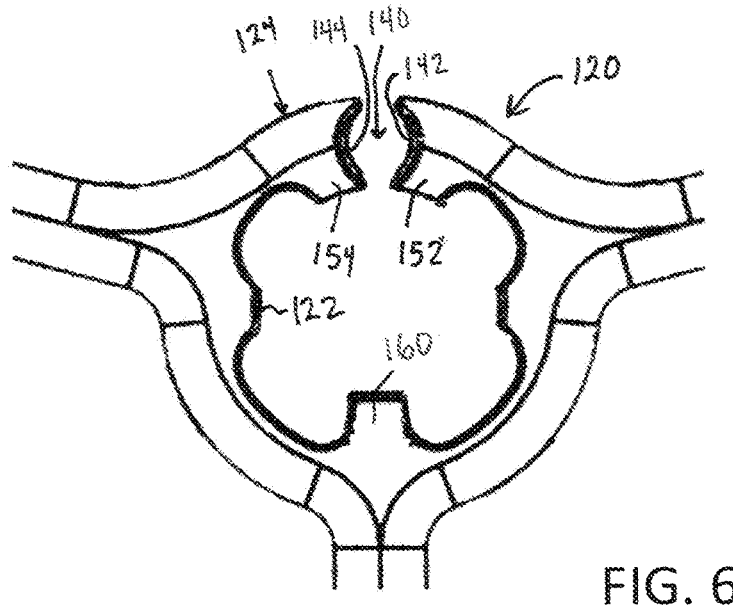
FIG. 6 is a detailed view of the flexible hub of the roller of FIG. 4.

The illustrative flexible hub 120 further includes a key 160 opposite the peripheral gap 140 configured to be received in a keyway 18 on the shaft 12 (as shown in FIG. 5) to facilitate seating of the shaft 12 in the expandable shaft opening 130. The key 160 allows the shaft 12 to selectively slide through the expandable opening 130 while securing the radial position of the roller 100 relative to the shaft 12.

The flexible hub 120 is formed of a resilient material that allows separation of the legs forming the peripheral gap 140 to enlarge the shaft opening 130 upon application of a certain amount of force to disengage from the shaft 12. When the force is removed, the flexible hub 120 snaps back into a relaxed state with a smaller shaft opening 130 that engages the shaft 12, with the positioning tabs 152, 154 inserted in the peripheral groove 16. However, even when fully flexed, the widened peripheral gap 140 prevent radial migration of the shaft 12 from the shaft opening 130.

The illustrative conveyor roller 100 includes three spokes 150, but the invention is not so limited. For example, fewer or more spokes may be used to connect the flexible hub 120 to the rim 160. Alternatively, webbing or another suitable connector may connect the hub 110 to the rim 160, or portions or all of the flexible hub may be integral with the rim 110. An illustrative first spoke 150*a* extends from the outer surface 124 of the flexible hub opposite the peripheral gap 140 toward the rim 160. A second spoke 150*b* extends from the outer surface 124 of the flexible hub between the first spoke 150*a* and the peripheral gap 140. A third spoke 150*c* extends from the outer surface 124 of the flexible hub between the first spoke and the peripheral gap and separated from the first spoke and third spoke by more than 90°. The radial distance between the second and third spokes 150*b*, 150*c* is larger than the radial distance between the first spoke 150*a* and second spoke 150*b* and the radial distance between the first spoke 150*a* and the third spoke 150*c*.

Figure 7:
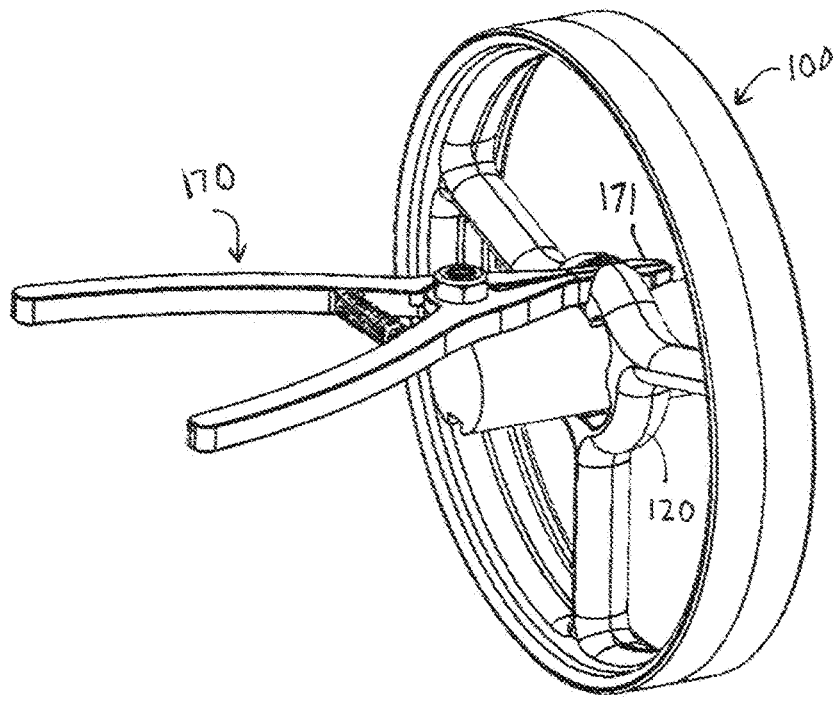
FIG. 7 shows the roller and shaft of FIG. 3 during removal of the shaft using an expansion tool.
Figure 8:
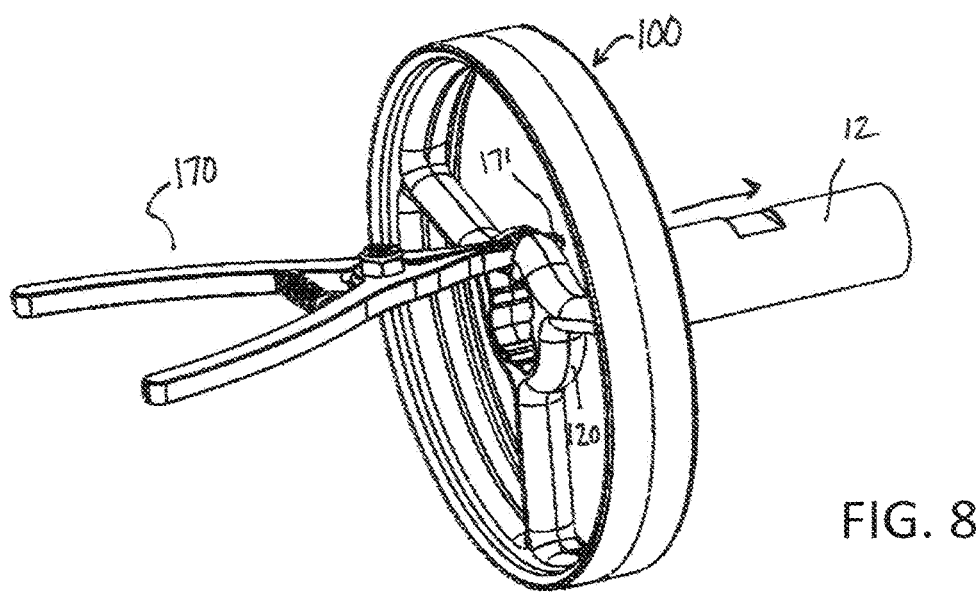
FIG. 8 shows the roller and shaft of FIG. 7 after removal of the shaft.

As shown in FIGS. 7 and 8, an expansion tool 170 can be used to selectively enlarge the peripheral gap 140 and shaft opening 130 to allow insertion, removal and—or sliding of a shaft 12 into, from and relative to the roller 100. The illustrative expansion tool 170 comprises snap ring pliers having spreadable tips 171. The spreadable tips 171 can be inserted into the peripheral gap 140 of a locked roller 100, as shown in FIG. 7. Then, a user spreads the tips 171 to widen the peripheral gap 140, enlarge the shaft opening 130 and pull the positioning tabs 152, 154 out of the peripheral groove 16. With the shaft opening enlarged 130, the user can pull the shaft 12 from the roller 100 in the axial direction. Once the expansion tool 170 is removed, the flexible hub 120 snaps back into the relaxed position, constricting the shaft opening 130 and peripheral gap 140. To mount a roller 100 on the shaft, the expansion tool can be inserted into the peripheral gap 140 and activated to enlarge the shaft opening 130. In the expanded position, a shaft 12 can slide into the flexible hub 120. When the positioning tabs 152, 154 are above the peripheral groove 16, the expansion tool 170 can be removed, causing the flexible hub 120 to snap into an engaged, locked position on the shaft 12.

Figures 9, 10:
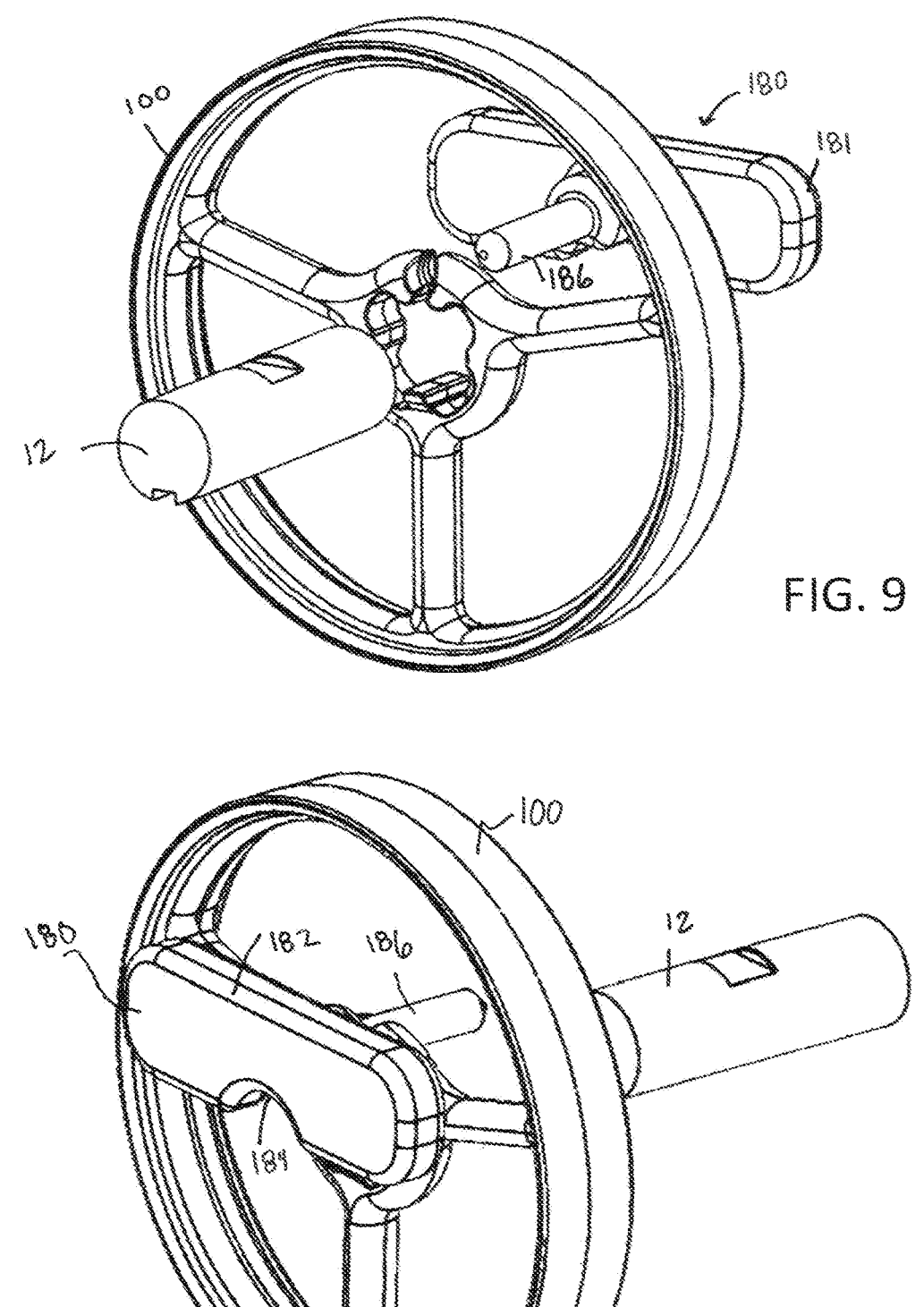
FIG. 9 shows an expansion tool and roller with a flexible hub according to another embodiment.
FIG. 10 shows the expansion tool and roller of FIG. 9 with the expansion tool in an engaged position.

FIGS. 9 and 10 show another embodiment of an expansion tool 180 suitable for selectively expanding a flexible hub 120 of a roller 100. The expansion tool 180 includes a handle 182 having a recess 184 in a bottom edge for accommodating the top of the shaft 12. An expansion rod 186 extends from the handle 182 and is configured to be inserted in the peripheral gap 140 to widen the gap and expand the shaft opening 130 to allow the shaft 12 to slide therethrough.

Figure 11:
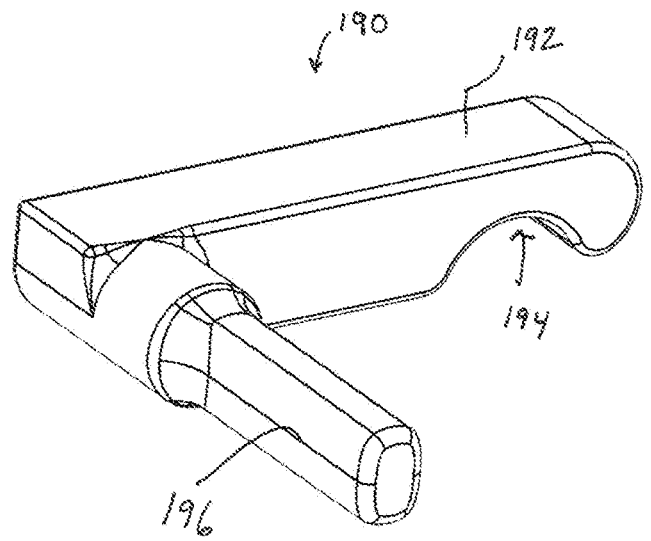
FIG. 11 shows another embodiment of an expansion tool suitable for use with a conveyor component with a flexible hub.

Any suitable means for selectively enlarging the shaft opening 130 by widening the peripheral gap 140 can be used. For example, FIG. 11 shoes an embodiment of an expansion tool 190 suitable for selectively expanding a flexible hub of a roller, sprocket or other conveyor component. The expansion tool 190 includes a handle 192, which may include a recess 194, and an oblong shaft 196 extending perpendicular to the handle for expanding the gap 140 to enlarge a flexible hub of a conveyor component. The oblong shaft 196 can be inserted into the gap 140, then rotated to expand the gap 140.

Figure 12:
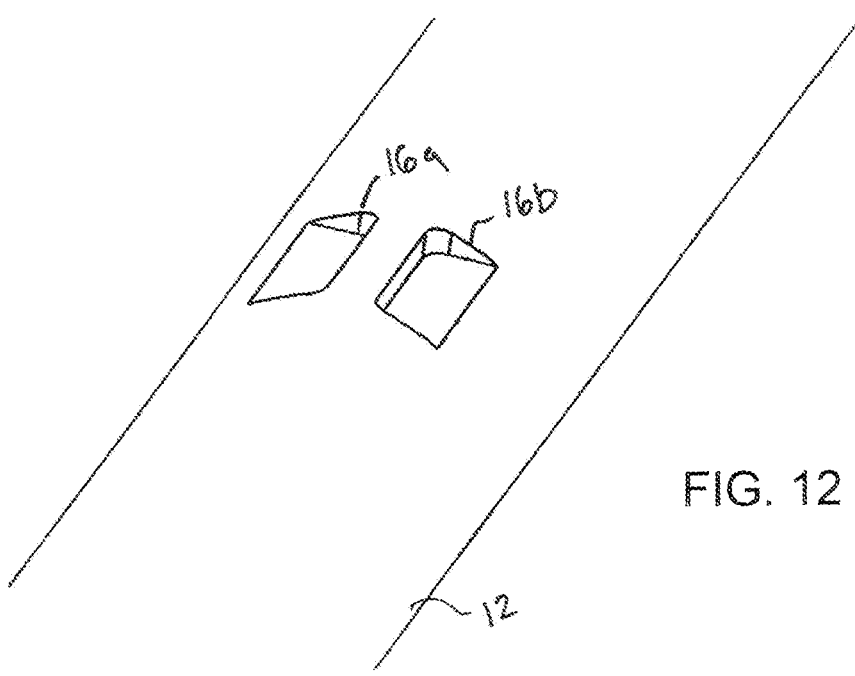
FIG. 12 is an isometric detailed view of a mounting portion of a shaft suitable for mounting a roller with a flexible hub according to another embodiment.

In another embodiment, shown in FIG. 12, the peripheral groove 16 on the shaft 12 for accommodating the roller 100 comprises two notches 16*a*, 16*b*, each configured to receive and constrain a positioning tab 152, 154.

In one embodiment, the peripheral groove 16 or notches 16*a*, 16*b* can be longer than the positioning tabs 152, 154 to allow the roller 100 to float along a selected mounting region of the shaft 12.

Figure 13:
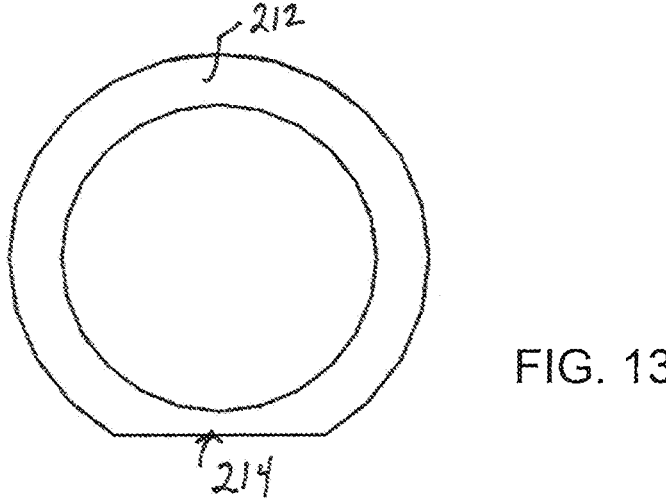
FIG. 13 is a front view of a shaft for a roller with a flexible hub according to another embodiment.
Figure 14:
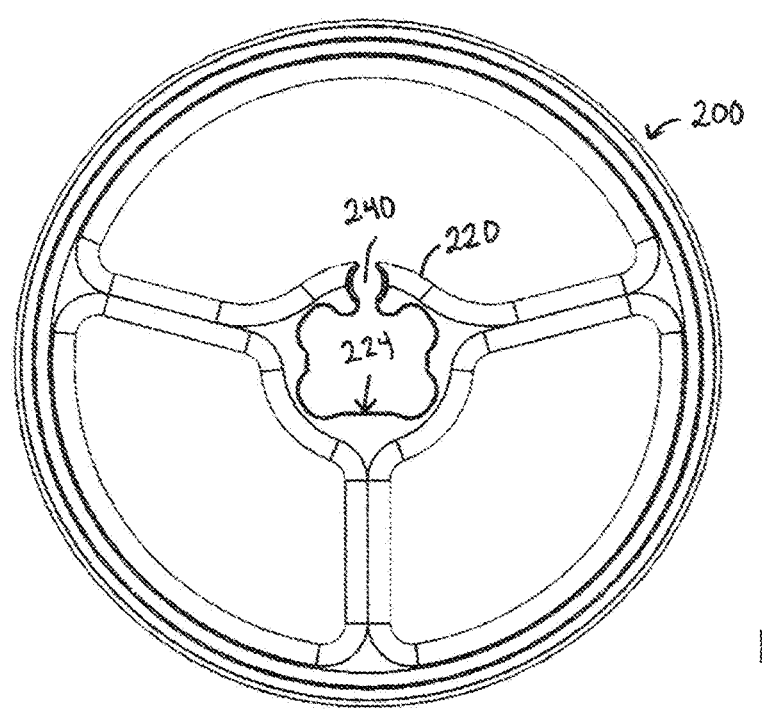
FIG. 14 is a front view of a roller suitable for mounting the shaft of FIG. 13.
Figure 15:
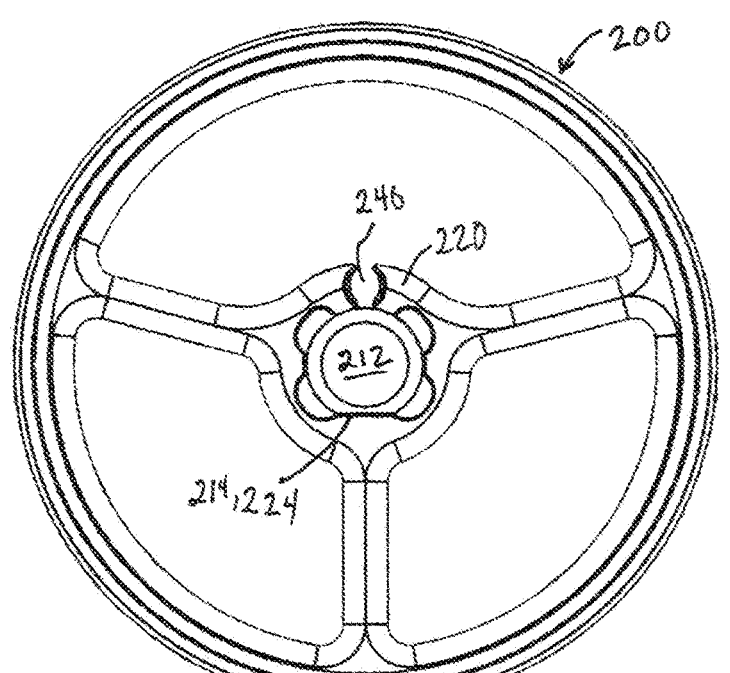
FIG. 15 is a front view of an assembly comprising the roller of FIG. 14 mounted on the shaft of FIG. 13.

Referring to FIGS. 13-15, in another embodiment, a roller 200 with a flexible hub 220 includes a flat radially-inward facing surface 224 opposite an expandable peripheral gap 240. An associated mounting shaft 212 has a flat bottom surface 214 that bears against the flat surface 224 of the flexible hub 220. The interfacing flat surfaces 214, 224 allow axial sliding of the shaft 212 and flexible hub 220 relative to each other when the flexible hub 220 is in an expanded position while locking the relative radial positions of the roller 200 and shaft 212 relative to each other when the roller 200 is in an engaged position.

Figures 16, 17, 18:
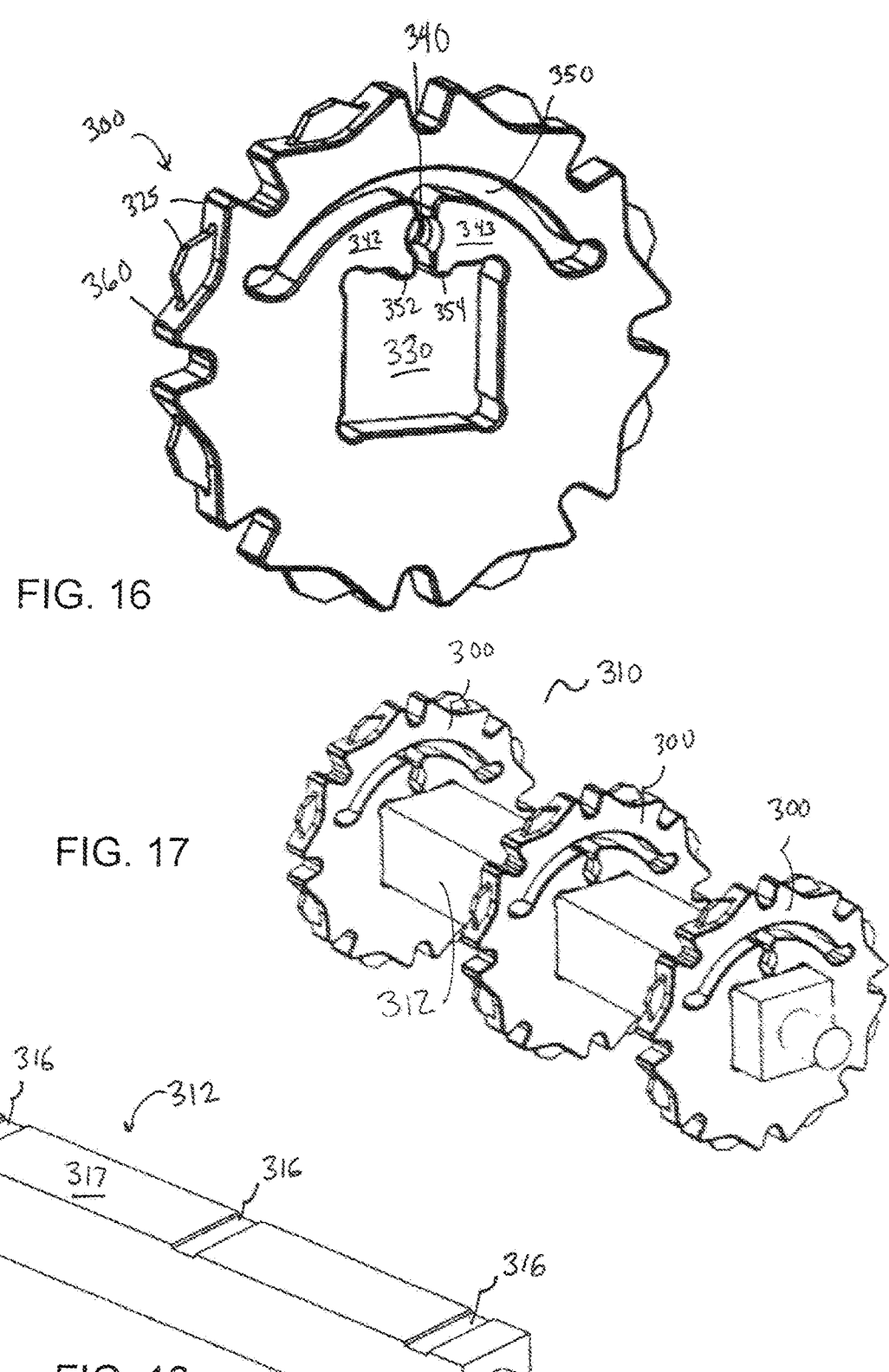
FIG. 16 is an isometric view of a roller having a flexible hub forming a sprocket according to another embodiment.
FIG. 17 is an isometric view of a sprocket assembly including sprockets shown in FIG. 16.
FIG. 18 is an isometric view of the shaft used in the sprocket assembly of FIG. 17.

In another embodiment, shown in FIG. 16, a sprocket 300 includes a flexible hub forming a square-shaped shaft opening 330 including a peripheral gap 340 formed by confronting, flexible legs 342, 343 including radially inwards extending tabs 352, 354. The periphery 360 of the sprocket 300 includes drive teeth 325 for driving a conveyor belt. The body of the sprocket 300 extends radially inwards from the periphery to form the shaft opening 330. A curved slot 350 separates the periphery 360 from the legs 342, 343 to impart flexibility to the legs 342, 343 to allow widening of the opening 330 when a tool is inserted to enlarge the peripheral gap 340. As described above, enlarging the peripheral gap 340 widens the shaft opening 330 to allow a shaft to move therethrough until a mounting portion of the shaft is aligned with tabs 352, 354. Then, the tool can be removed to snap the sprocket 300 onto the shaft such that the tabs 352, 354 are inserted in a peripheral groove on the shaft.

FIG. 17 shows a sprocket assembly 310 including a plurality of sprockets 300 mounted on a shaft 312 having a square cross-section. Each sprocket is mounted in a mounting region of the shaft 312. As shown in FIG. 18, the illustrative shaft 312 includes a groove 316 in each mounting region. The illustrative groove 316 is uniform in depth and axial length and extends across the width of the latching surface 317, but the shaft 312 can have any suitable configuration for mounting a sprocket with a flexible hub. For example, some grooves 316 may be sized to prevent axial movement of the sprocket, while others may be sized to allow a certain amount of float of the associated sprocket along the shaft 312.

Figure 19:
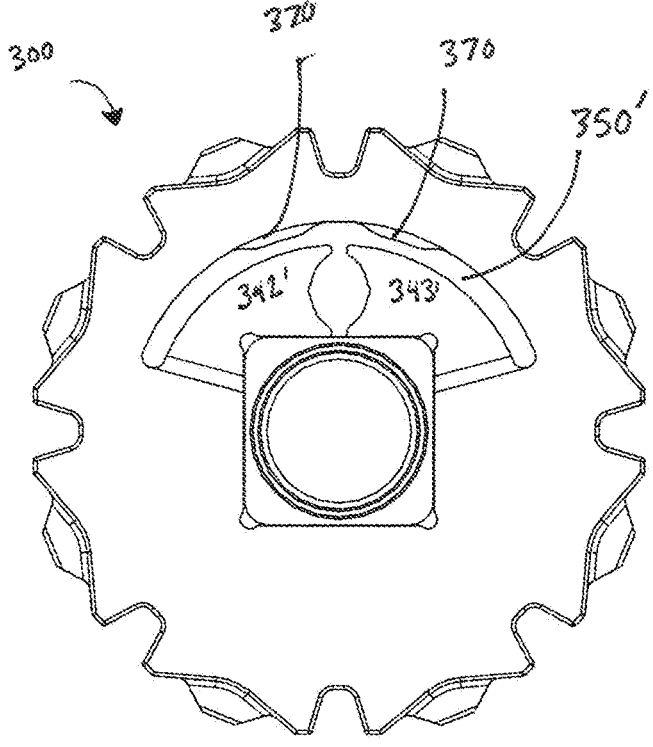
FIG. 19 is a front view of a sprocket with a flexible hub including stopping protrusions according to another embodiment.

In another embodiment, a component, such as a sprocket 300' with a flexible hub, may include stopping protrusions 370 in a curved slot 350' to limit the flexing of the legs 342', 343' to prevent or reduce breakage, as shown in FIG. 19.

Figure 20:
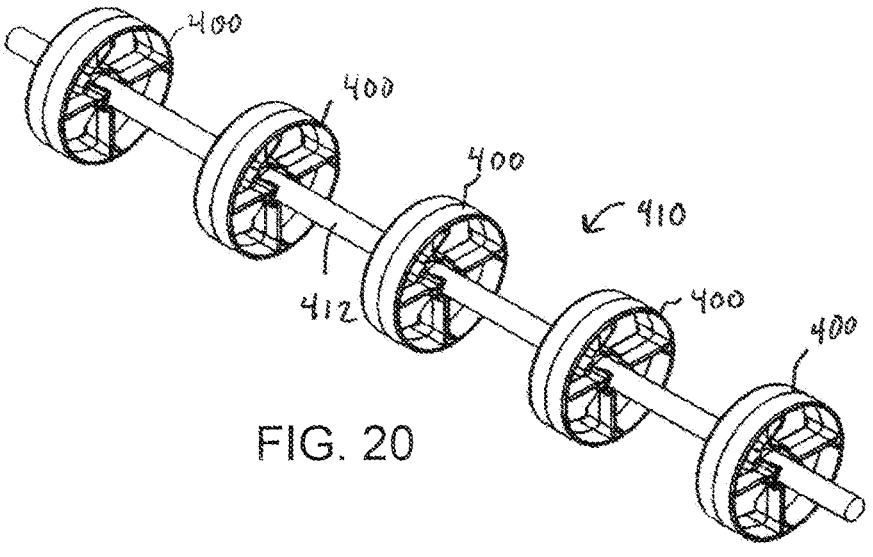
FIG. 20 is an isometric view of a roller assembly including rollers having flexible hubs according to another embodiment.
Figure 21:
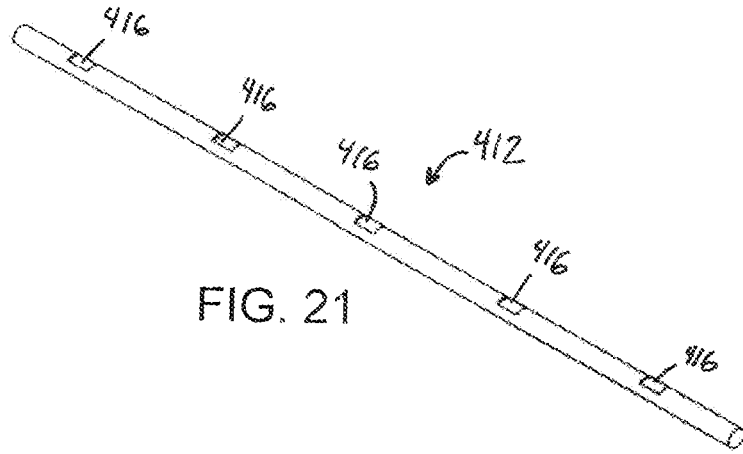
FIG. 21 is an isometric view of a shaft suitable for use in the roller assembly of FIG. 20.
Figure 22:
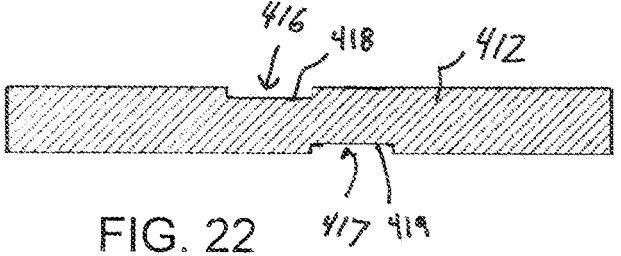
FIG. 22 is a cross-sectional view of the shaft of FIG. 21.

FIG. 20 shows another embodiment of a roller assembly 410 including a series of conveyor rollers 400 mounted on a mounting shaft 412 in a conveyor. The rollers 400 may comprise flexible hubs to facilitate mounting and dismounting of the respective roller on the mounting shaft 412. As shown in FIGS. 21 and 22, the illustrative mounting shaft 412 has a main portion that has a circular cross-section. In each mounting region, the shaft 412 includes offset and opposing grooves 416, 417 in the peripheral surface of the mounting shaft 412. Each groove 416, 417 includes a flat bottom surface 418, 419 to seat flat radially inner surfaces on an associated roller 400 to prevent or limit migration of the roller along the axial length of the mounting shaft 412, as described below.

As shown in FIGS. 23-26, the illustrative conveyor roller 400 comprises a flexible hub 420 for mounting a shaft 412. The roller 400 includes a rim 460 having a continuous and closed periphery. Spokes, webbing or another connecting means connect the flexible hub 420 to the rim 460. Alternatively, the body between the flexible hub 420 and rim 460 may be solid or otherwise configured. In the illustrative embodiment, the roller 400 includes four equally spaced apart spokes 471, 472, 473, 474 connecting the flexible hub 420 to the rim 460, but the invention is not so limited.

Figure 26:
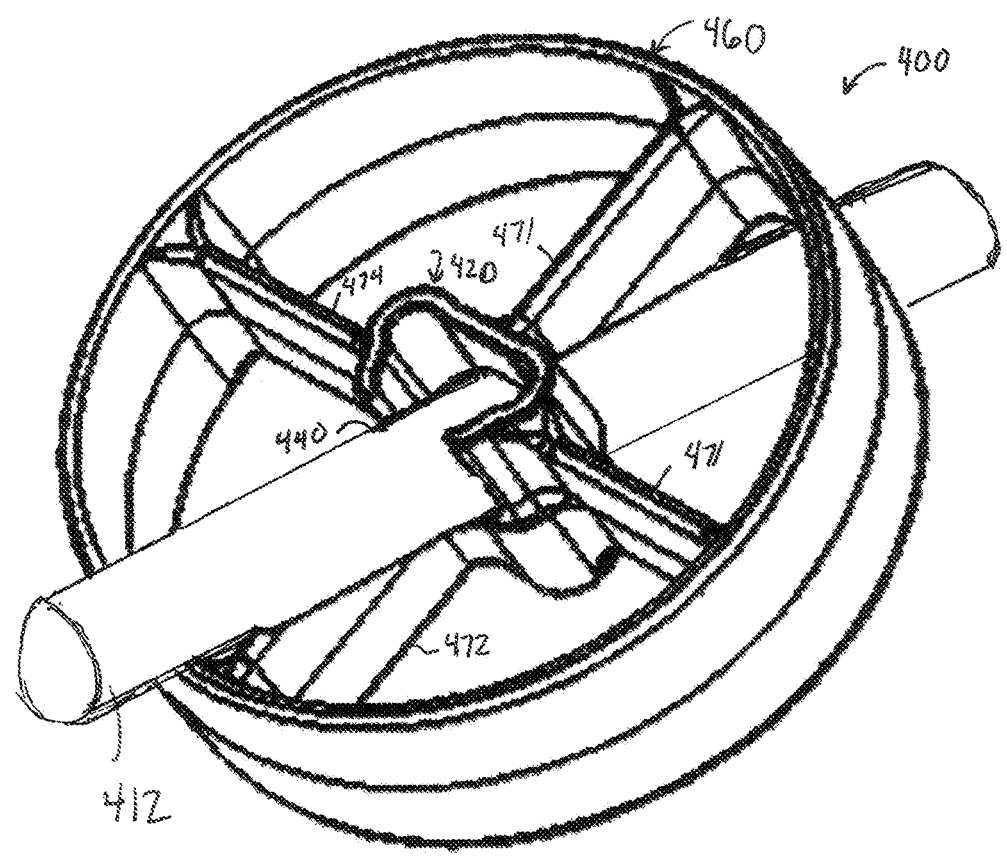
FIG. 26 is an isometric view of the roller of FIG. 23, showing the oblique shaft mounting opening.
Figures 27, 28, 29:
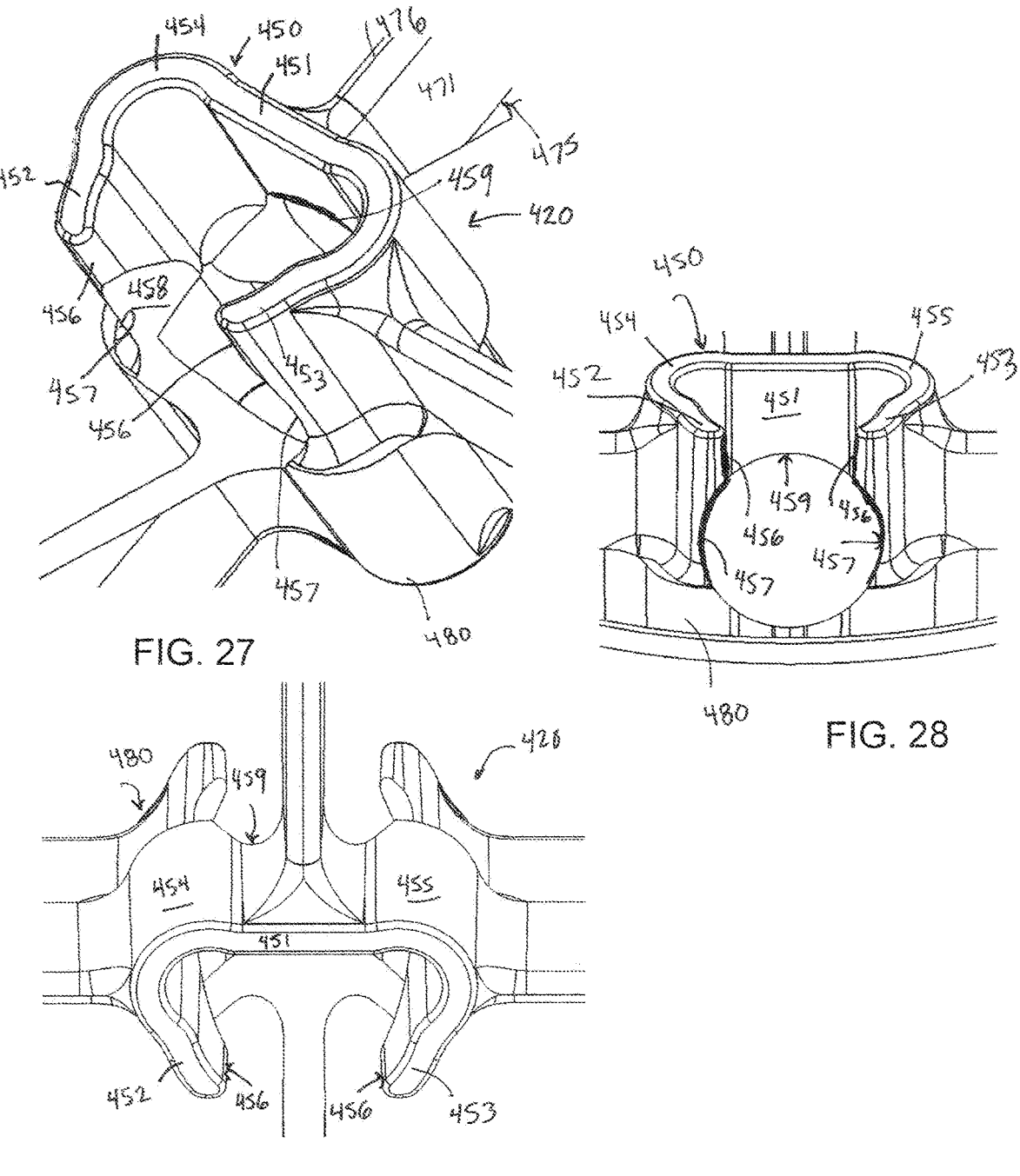
FIG. 27 is a detailed isometric view of the flexible hub of the roller of FIG. 23.
FIG. 28 is another detailed view of the flexible hub of FIG. 27.
FIG. 29 is a top isometric view of the flexible hub of FIG. 27.
Figure 30:
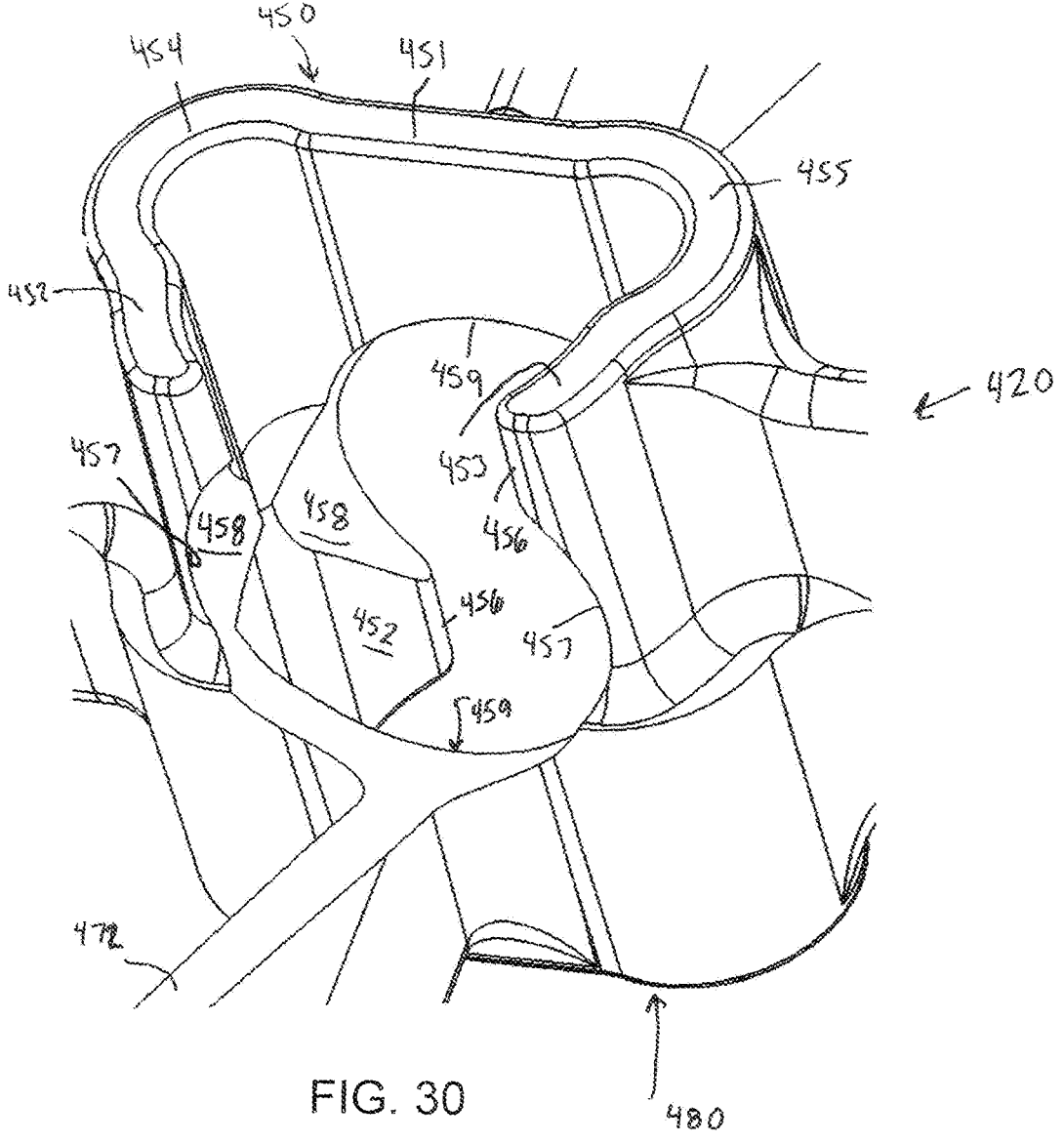
FIG. 30 is another detailed view of the flexible hub of FIG. 27.

The flexible hub 420 includes radially inner surfaces forming an axially-extending shaft opening 430 for mounting the shaft 412 in an operating position. The axially-extending shaft opening 430 has non-uniform, non-circular cross-section to seat an associated shaft 412 in a particular position and orientation. The axially-extending shaft opening 430 includes two expandable peripheral gaps to allow insertion of the shaft into the flexible hub. The axially-extending shaft opening does not allow passage of the shaft therethrough when the shaft extends axially relative to the roller 400 in an operation position. The flexible hub 420 includes radially inner surfaces forming an oblique mounting opening 440 having a circular cross section and extending along an axis that is oblique to the longitudinal axis of the shaft for initially inserting the shaft 412 into the flexible hub 420, as shown in FIG. 26. When angled to match the oblique mounting opening 440, the shaft can pass through the flexible hub 420.

Referring to FIGS. 27-30, the illustrative flexible hub 420 comprises a first clamping portion 450 on a first axial end of the flexible hub 420 opening in a first radial direction. The first clamping portion 450 comprises a flat end wall 451 configured to abut a flat bottom surface 418 on the shaft 412 when in the operating position. Tapering, shaped legs 452, 453 connect to the flat end wall 451 via curved connecting walls 454, 455. The illustrative tapering, shaped legs 452, 453 have inner surfaces that are slightly concavely-curved and form a slight bump at an intersection with the curved connecting walls 454, 455. The tapering, shaped legs 452, 453 can be flexible to selectively widen the opening (peripheral gap) therebetween to allow insertion of a shaft.

The tips of the tapering, shaped legs 452, 453 include axially outer straight edges 456 and curved axially inner edges 457 defining edges of the oblique mounting opening 440. Curved, shaped surfaces 458 extend tangentially from the curved axially inner surfaces 457 to form bearing surfaces for the oblique mounting opening 440.

An axially inner edge of the flat end wall 451 includes a curved recess 459 extending in two dimensions that also defines a boundary of the oblique mounting opening 440. The axially-outer edge of the illustrative first clamping portion 450 extends in one plane, but the invention is not so limited.

The flexible hub 420 further includes a second clamping portion 480 on a second axial end of the flexible hub 420 opening in a second radial direction opposite the first radial direction. The axially inner ends of the first and second clamping portions 450, 480 abut and are integral with each other. The second clamping portion 480 is identical in configuration to the first clamping portion 460, except rotated 180° so that the flexible hub 420 is axially symmetric about an axis of symmetry S (shown in FIG. 25) bisecting the flexible hub 420. The second clamping portion 480 cooperates with the first clamping portion 450 to define the non-uniform shaft opening 430 and the oblique mounting opening 440.

Figures 23, 24, 25:
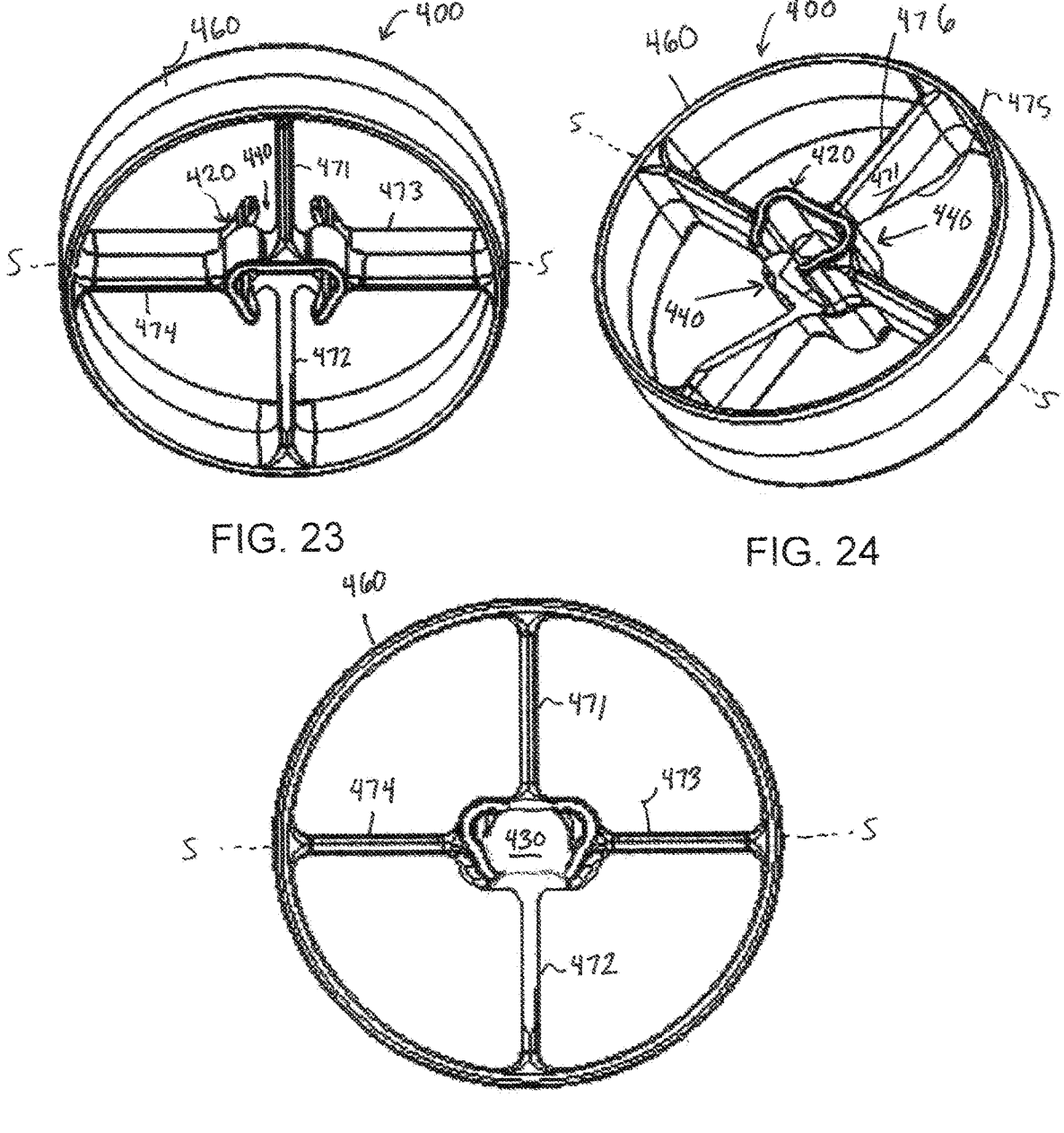
FIG. 23 is a top-front view of a roller including a flexible hub according to an embodiment.
FIG. 24 is an isometric view of the roller of FIG. 23.
FIG. 25 is a front view of the roller of FIG. 23.

As best shown in FIG. 24, a first spoke 471 extending from the rim 460 and intersecting an outer surface of the flat end wall 451 includes an oblique inner surface 475 forming another bearing surface for the oblique mounting opening 440. The illustrative axial outer surface 476 of the first spoke 471 extends radially, so that the first spoke 471 tapers from the rim 460 to the flexible hub 420, but the invention is not so limited.

A second spoke 472 extends from an outer surface of the second clamping portion flat end wall 451 and includes an oblique inner surface parallel to the oblique inner surface 471 and cooperating to further define the oblique mounting opening 440.

Third and fourth spokes 473, 474 extend radially from the outer walls of the clamping portions 450, 480 to further connect the flexible hub 420 to the rim 460, but the invention is not so limited.

Figure 31:
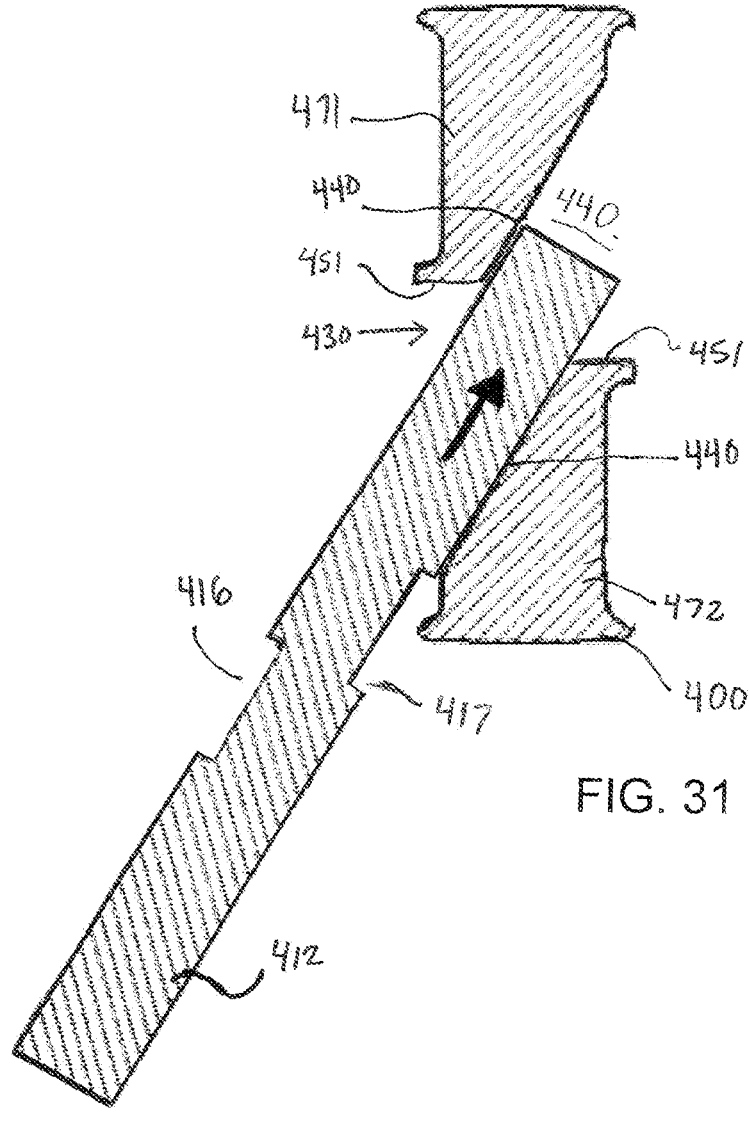
FIG. 31 is a cross-sectional view of the roller of FIG. 23 during insertion of a shaft.
Figure 32:
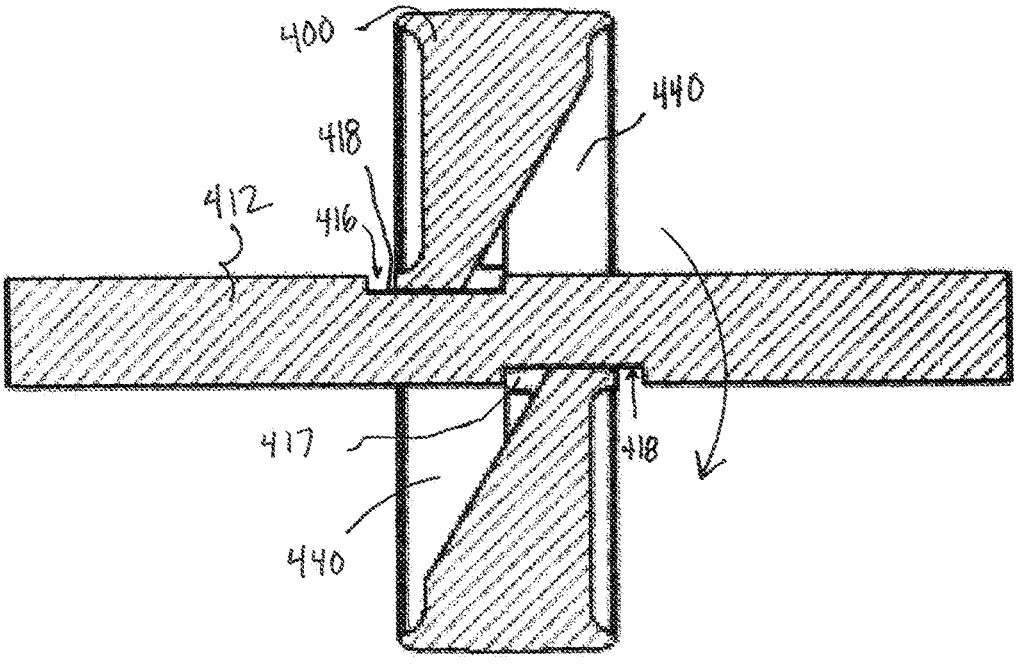
FIG. 32 is a cross-sectional view of the roller of FIG. 23 after the roller is mounted on the shaft.

To mount the roller 400 on a corresponding shaft 412, the roller 400 is first angled to align the oblique mounting opening 440 with the shaft 412. Then, as shown in FIG. 31, the shaft 412 slides through the oblique opening 440 until the shaft grooves 416, 417 are below the flat end walls 451 of the flexible hub 420. As shown in FIG. 32, the roller is then rotated about the shaft (or the shaft relative to the roller), bringing the shaft 412 into contact with the bottoms of the clamping portions 450, 480 forming the flexible hubs. Further rotation of the shaft forces open the clamping portions, separating the tapering, shaped legs 452, 454, pushing the shaft 412 into the axially-extending shaft opening 430. The shaft snaps into place within the clamping portions 350, 380, such that the flat surfaces 418 of the grooves 416, 417 abut the flat end walls 451 of the clamping portion 450, 480, with the tapering, shaped legs seating the body of the shaft.

Figures 33, 34:
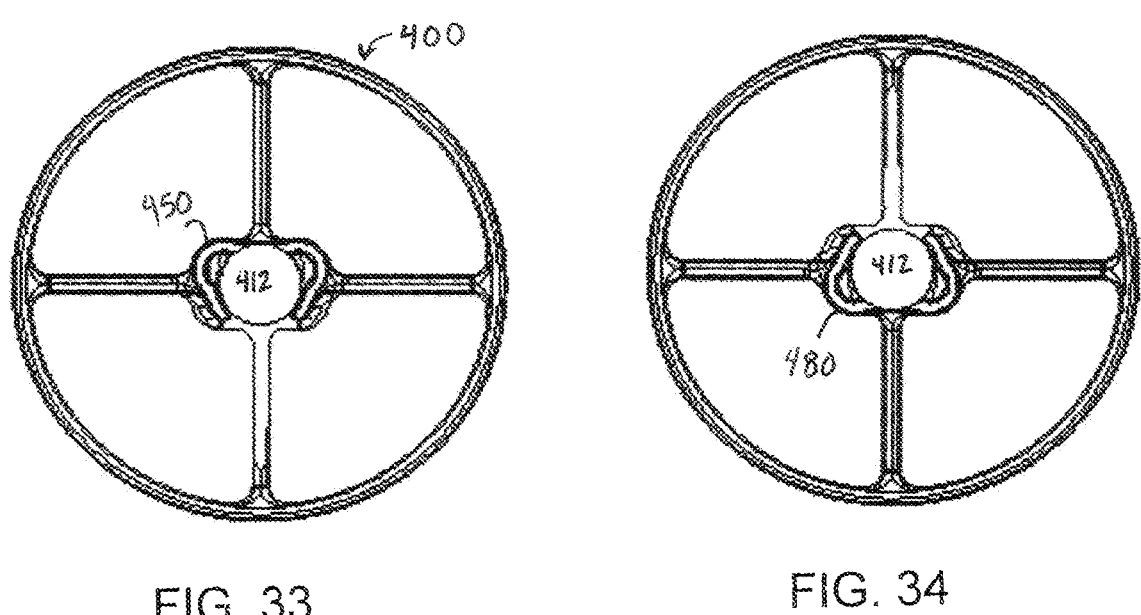
FIG. 33 is a front view of the roller and shaft of FIG. 32.
FIG. 34 is a side view of the roller and shaft of FIG. 32.
Figure 35:
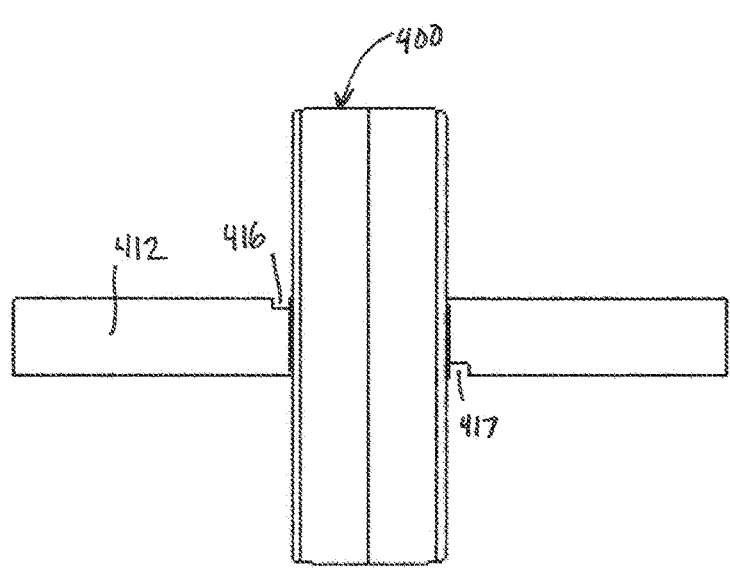
FIG. 35 is a rear view of the roller and shaft of FIG. 32.

FIGS. 33-35 show a roller 400 mounted on a mounting region of the shaft 412 and constrained by the interaction between the clamping portions 350, 380 and grooves 416, 417.

Figure 36:
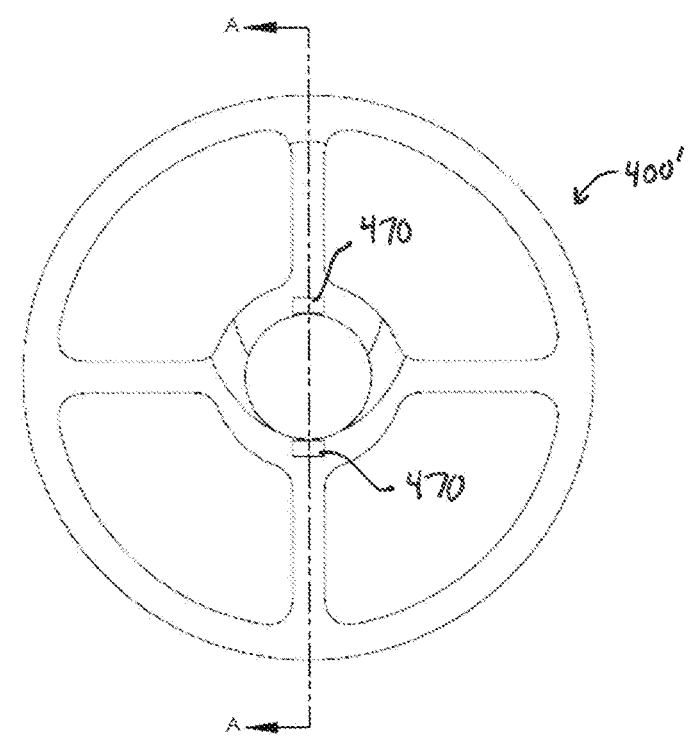
FIG. 36 is a front view of a roller with a flexible hub having magnets according to another embodiment.
Figure 37:
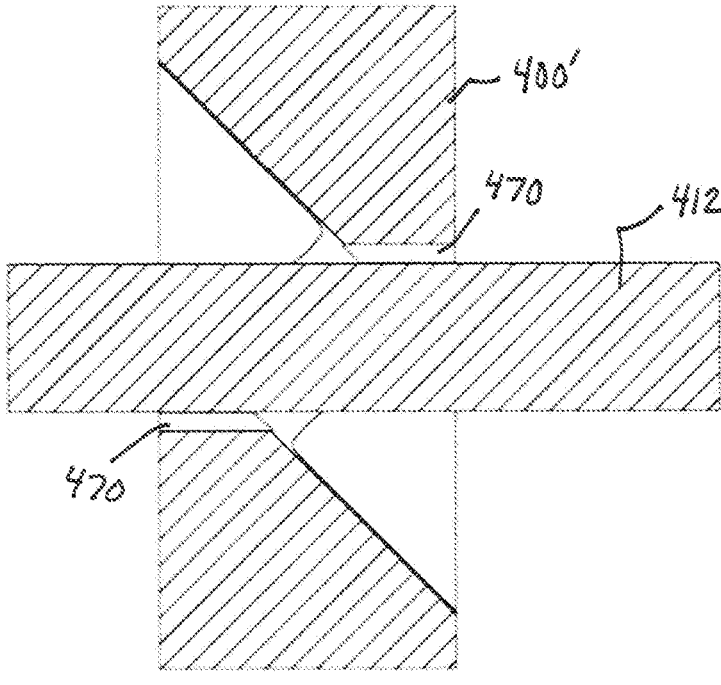
FIG. 37 is a cross-sectional view through line A-A of the roller of FIG. 36.

In another embodiment, shown in FIGS. 36-37, a roller 400' with a flexible hub includes magnets 470 for latching the shaft 412, which is formed of a magnetically-attractive material, in a locked position.

The invention is not limited to the illustrative conveyor roller, sprocket and—or mounting shaft, and encompasses variations and alterations of these embodiments. For example, the illustrative flexible hubs may be implemented in any shaft-mounted conveyor component, not limited to rollers and sprockets.

The invention claimed is:

1. A component for a conveyor, comprising:
   a flexible hub having a radially inner surface forming an axially-extending, expandable shaft opening for receiving a shaft, a radially outer surface and a peripheral gap between the radially inner surface and the radially outer surface for allowing the shaft opening to selectively expand, the flexible hub including a flexible leg having a radially inwards-extending tab configured to be received in a peripheral groove on the shaft received in the shaft opening and a first concave end face defining a portion of the peripheral gap; and
   a rim connected to the flexible hub, the rim having a continuous periphery for contacting a conveyor belt.

2. The component of claim 1, wherein the peripheral gap is formed between the first concave end face and a second concave end face confronting the first concave end face and formed on a second flexible leg.

3. The component of claim 2, wherein the first and second concave end faces form an axially-extending cylindrically-shaped space therebetween.

4. The component of claim 2, wherein the confronting concave end faces include radially outer tips and radially inner tips.

5. The component of claim 2, further comprising a curved slot between the rim and the first and second flexible legs.

6. The component of claim 1, further comprising a key extending from the radially inner surface of the flexible hub opposite the peripheral gap, the key configured to be received in a keyway on the shaft.

7. The component of claim 1, wherein the flexible hub further comprises a flat radially-inward facing surface opposite the peripheral gap for bearing against a flat surface on the shaft.

8. The component of claim 1, further comprising a first spoke extending radially from the radially outer surface of the flexible hub opposite the peripheral hub for connecting the flexible hub to the rim.

9. The component of claim 8, further comprising a second spoke extending from the outer surface of the flexible hub between the first spoke and the peripheral gap and a third spoke extending from the outer surface of the flexible hub between the first spoke and the peripheral gap and separated from the first spoke and third spoke by more than 90°.

10. An assembly for a conveyor comprising:
an axially-extending shaft including a peripheral groove; and
a component mounted on the shaft, the component having a flexible hub forming an axially-extending, radially-expandable shaft opening for receiving the axially-extending shaft, the flexible hub including a flexible leg having a radially inwards-extending tab configured to be received in the peripheral groove, the component further including a rim connected to the flexible hub, the rim having a continuous periphery for contacting a conveyor belt.

11. The assembly of claim 10, wherein the flexible hub includes a peripheral gap formed by confronting concave end faces, a first confronting concave end face formed on the flexible leg.

12. The assembly of claim 10, further comprising a key extending from the radially inner surface of the flexible hub, and a keyway on the shaft for receiving the key to rotationally lock the component relative to the shaft.

13. The assembly of claim 10, where the shaft includes journals on each end to facilitate rotation of the assembly.

14. The assembly of claim 10, wherein the component is one of a series of rollers having flexible hubs mounted on the shaft in mounting regions.

15. An assembly, comprising:
a conveyor component having a flexible hub having a radially inner surface forming an axially-extending, expandable shaft opening for receiving a shaft, a radially outer surface and a peripheral gap between the radially inner surface and the radially outer surface for allowing the shaft opening to selectively expand, the flexible hub including a flexible leg having a radially inwards-extending tab configured to be received in a peripheral groove on a shaft received in the shaft opening and a first concave end face defining a portion of the peripheral gap, and a rim connected to the flexible hub, the rim having a continuous periphery for contacting a conveyor belt; and
an expansion tool configured to selectively enlarge the peripheral gap to expand the shaft opening.

16. The assembly of claim 15, wherein the expansion tool comprises a handle including a recess for accommodating a top portion of a shaft and a rod configured to be inserted in the peripheral gap.

17. The assembly of claim 16, wherein the rod is oblong.

18. The assembly of claim 15, further comprising a shaft inserted in the flexible hub, the shaft including a peripheral groove for engaging the radially inwards-extending tab.

19. The assembly of claim 15, wherein the tool pulls the radially inwards-extending tab out of the groove.

* * * * *